(12) United States Patent
Lindoff et al.

(10) Patent No.: US 9,603,061 B2
(45) Date of Patent: Mar. 21, 2017

(54) RADIO ACCESS TECHNOLOGY SELECTION

(71) Applicant: Telefonaktiebolaget L M Ericsson (publ), Stockholm (SE)

(72) Inventors: Bengt Lindoff, Bjärred (SE); Johan Nilsson, Höllviken (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 63 days.

(21) Appl. No.: 14/651,682

(22) PCT Filed: Dec. 2, 2013

(86) PCT No.: PCT/EP2013/075228
§ 371 (c)(1),
(2) Date: Jun. 12, 2015

(87) PCT Pub. No.: WO2014/090616
PCT Pub. Date: Jun. 19, 2014

(65) Prior Publication Data
US 2015/0327125 A1 Nov. 12, 2015

Related U.S. Application Data

(60) Provisional application No. 61/758,864, filed on Jan. 31, 2013.

(30) Foreign Application Priority Data

Dec. 14, 2012 (EP) .................................... 12197341

(51) Int. Cl.
*H04W 36/00* (2009.01)
*H04W 36/30* (2009.01)
(Continued)

(52) U.S. Cl.
CPC ....... *H04W 36/0022* (2013.01); *H04W 36/30* (2013.01); *H04W 48/18* (2013.01); *H04W 88/06* (2013.01)

(58) Field of Classification Search
USPC ... 455/437, 436, 552.1, 456.1; 370/335, 331
See application file for complete search history.

(56) References Cited

U.S. PATENT DOCUMENTS 9,049,748 B2 * 6/2015 Lee ...................... H04W 48/16
9,215,725 B2 * 12/2015 Behnamfar ......... H04W 72/085
(Continued)

FOREIGN PATENT DOCUMENTS

EP 2472985 A 7/2012
WO 2011090339 A2 7/2011

*Primary Examiner* — David Q Nguyen
(74) *Attorney, Agent, or Firm* — Coats & Bennett, P.L.L.C.

(57) ABSTRACT

There is provided association of a radio access technology, RAT, supported by a wireless device, WD, with a first service. The WD supports at least a first RAT, a second RAT and a third RAT. The second RAT supports a first service and a second service, the first RAT supports the first service but not the second service, and the third RAT supports at least the first service. An indicator that the second service is to be associated with the second RAT is acquired. An indicator that said third RAT is available for use is acquired. Channel measurements for at least one of the second RAT and the third RAT are acquired. The first service is associated with one of the second RAT and the third RAT based on the acquired channel measurements.

22 Claims, 3 Drawing Sheets

(51) Int. Cl.
*H04W 48/18* (2009.01)
*H04W 88/06* (2009.01)

(56) References Cited

U.S. PATENT DOCUMENTS

| | | | |
|---|---|---|---|
| 2010/0278142 A1* | 11/2010 | Dwyer | H04W 36/0083 370/331 |
| 2010/0317347 A1 | 12/2010 | Burbidge et al. | |
| 2011/0009130 A1* | 1/2011 | Wu | H04W 64/00 455/456.1 |
| 2012/0069823 A1* | 3/2012 | Low | H04W 4/00 370/335 |
| 2013/0244660 A1* | 9/2013 | Kumar | H04W 36/165 455/436 |

* cited by examiner

RADIO ACCESS TECHNOLOGY SELECTION

TECHNICAL FIELD

Embodiments presented herein relate to radio access technology, RAT, association in a wireless device, WD, and particularly to associating a RAT supported by the WD with a first service.

BACKGROUND

In mobile communication networks, there is always a challenge to obtain good performance and capacity for a given communications protocol, its parameters and the physical environment in which the mobile communication network is deployed.

The evolution of the Universal Mobile Telecommunications Standard Long Term Evolution (UMTS LTE) for mobile communications continues with new features to increase the overall capacity and to increase the general performance of the communications network.

Wireless communication devices (hereinafter simply denoted wireless device, or WD for short) are typically built up in a modular fashion. Inside the WD there is typically one module/chipset supporting cellular systems, for instance GSM/WCDMA/LTE, and another separate chipset supporting short range wireless communications like WLAN and Bluetooth. Mainly due to cost reasons the cellular chipset in the WD is arranged only to support one active cellular Radio Access Technology (RAT), such as either GSM or WCDMA or LTE at the time. However the WD is typically arranged to handle one cellular RAT and a WLAN based RAT simultaneously.

In case there is cellular coverage, LTE would be the preferred RAT to use by the WD since LTE provides the highest data rates and lowest latency, etc. However LTE only supports packet switched (PS) services and does not support circuit switched (CS) services like speech in GSM and WCDMA. For voice services, voice over LTE (VoLTE) is a future technology to be used in LTE, but it will take a long time until an internet protocol (IP) like voice service is in place everywhere and then LTE devices that are supporting CS voice services need to utilize CS fallback. Next follows a short description of CS fallback.

CS Fallback in LTE

LTE will not support CS voice services, as is used in WCDMA/UMTS and GSM. Furthermore, VoLTE services are currently not well supported, and will probably only gradually be introduced. Therefore, there has been, and still is, a need to introduce CS fallback solutions making it possible for LTE devices to be able to use speech services. Below follows a short description of how such fallback works in the case that a voice call either is initialed by the network (hereinafter denoted WD Terminated) or by the wireless device itself (hereinafter denoted WD Originated). FIG. 1 schematically illustrates a communication network illustrating the network nodes and interfaces used for CS fallback. These nodes will be further disclosed below.

Incoming Calls; WD Terminated Calls

The WD is arranged to register at the LTE network E-UTRAN with information about both PS and CS support (using WCDMA (3G) and/or GSM (2G)), and is assumed to be opera lively connected to an eNB of a serving cell in the E-UTRAN. When an incoming call for the subscriber arrives at the MSG server, a request is made to the Home Subscriber Service (HSS) for the location of the subscriber. The HSS then returns the information to an G-MSC that the subscriber is currently served by the SGs MSG. The call is then forwarded to the SGs MSG. The SGs MSC will then send a paging message over the SGs interface to a mobility management entity (MME) which will in turn inform the WD and require the WD to leave the LTE network (E-UTRAN) to accept the incoming voice call in a 2G or 3G cell. The WD is then arranged to perform the necessary instructions and start communication in the UTRAN or GERAN.

Switching from one radio access technology to another can be performed in several ways. In a redirect scenario the network is arranged to provide the WD with an instruction to select a different radio network. The instruction can contain information about the target cells to reduce the time it takes the WD to find a suitable cell and to establish communication with a network node in the cell. In another scenario a full Inter-Radio Access Technology (IRAT) packed switched domain handover from LTE to UMTS or GSM which is prepared in the network is performed and thus the interruption time is lower. In this scenario, the network can be arranged to instruct the WD to perform radio measurements. The results of those measurements are then used by the network to select a suitable target cell and to give the WD precise instructions of how to quickly connect to this cell to minimize the handover time.

Outgoing Calls; WD Originated Calls

When the user initiates a call (i.e., a so-called WD originated call), the WD is arranged to contact the network by transmitting an Extended Service Request message which contains a CS fallback indicator. The network is then arranged to decide, based on its capabilities and the capabilities of the WD, to perform one of the below actions:

A packet switched handover to a GSM or UMTS cell, which is the fastest way to associate the WD with a radio access technology by means of which the circuit switched call can be initiated.

A radio resource control (RRC) release with redirect to GSM or UMTS, optionally with information about possible target cells to decrease the time necessary to find the cell. This process may generally be somewhat slower than a handover as the WD is required to by itself (i.e. without relying on signalling of the LTE network) re-establish contact to the UMTS network.

An inter-RAT cell change order sent to the GSM network. Optionally, the network can include information on potential GSM cells in the area (a so-called Network Assisted Cell Change, NACC).

Contacting the network prior to leaving the LTE network is necessary in order for the WD's context in the LTE base station (eNodeB) to be deleted and in order to acquire additional information on potential target cells which may speed up the process.

There are also other situations when the WD needs to perform a HO or reselection from LTE to GSM/EDGE or WCDMA/HS. For instance, the network node can, due to load balancing between different RATs, order a HO of a WD from LTE to HS or EDGE. Another situation could be that the WD is moved beyond coverage from an LTE cell and therefore requires triggering of a HO/reselection to 2G/3G systems.

As noted above, a typical WD is capable of camping on either a cellular system (LTE/HS/EDGE) or a WLAN for PS services. The decision to use a cellular RAT or a WLAN RAT could be performed in several ways. For example, the choice for the WD to camp on (or operatively connect to) LTE or WLAN may be based on a metric determined for the WD to camp on (or operatively connect to) a network node of the LTE and a network node of the WLAN. The metric may, for instance, be signal strength based. However, none of the above disclosed selection techniques take into consideration the case when the WD is requested to perform a HO from LTE to another other cellular RAT, due to a reason as disclosed above and how to determine which RAT that then should handle the PS services.

Hence, there is still a need for an improved handling of associating a WD with a RAT.

SUMMARY

An object of embodiments herein is to provide improved handling of associating a WD with a RAT.

The inventors of the enclosed embodiments have realized that moving a packet service also to GSM when circuit switched fallback is performed from LTE to GSM will result in bad user experience in terms of packet service data rate.

A particular object is therefore to provide improved handling of association of a RAT supported by a wireless device WD with a first service when a handover of a second service supported by the WD is requested from a first RAT to a second RAT.

According to a first aspect there is presented a method of associating a radio access technology, RAT, supported by a wireless device, WD, with a first service. The WD supports at least a first RAT, a second RAT and a third RAT. The second RAT supports a first service and a second service, the first RAT supports the first service but not the second service, and the third RAT supports at least the first service. The method is performed by the WD. The method comprises acquiring an indicator that the second service is to be associated with the second RAT. The method comprises acquiring an indicator that said third RAT is available for use. The method comprises acquiring channel measurements for at least one of the second RAT and the third RAT. The method comprises associating the first service with one of the second RAT and the third RAT based on the acquired channel measurements.

Advantageously this enables improved association of the second service once the WD need to perform an IRAT HO or IRAT reselection.

According to a second aspect there is presented a wireless device, WD, (2) for associating a radio access technology, RAT, supported by the WD with a first service. The WD is arranged to support at least a first RAT, a second RAT and a third RAT. The second RAT supports a first service and a second service, the first RAT supports the first service but not the second service, and the third RAT supports at least the first service. The WD comprises a processing unit arranged to acquire an indicator that the second service is to be associated with the second RAT. The processing unit is farther arranged to acquire an indicator that said third RAT is available for use. The processing unit is further arranged to acquire channel measurements for at least one of the second RAT and the third RAT. The processing unit is further arranged to associate the first service with one of the second RAT and the third RAT based on the acquired channel measurements.

According to a fourth aspect there is presented a vehicle. The vehicle comprises a wireless device according to the second aspect.

According to a fourth aspect there is presented a computer program for associating a radio access technology, RAT, supported by the WD with a first service, the computer program comprising computer program code which, when run on a wireless device, causes the wireless device to perform a method according to the first aspect.

According to a fifth aspect there is presented a computer program product comprising a computer program according to the fourth aspect and a computer readable means on which the computer program is stored. According to an embodiment the computer readable means are non-volatile computer readable means.

It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The inventive concepts will now be described more fully hereinafter with reference to the accompanying drawings, in which certain embodiments of are shown. The inventive concepts may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description.

Figure 1:
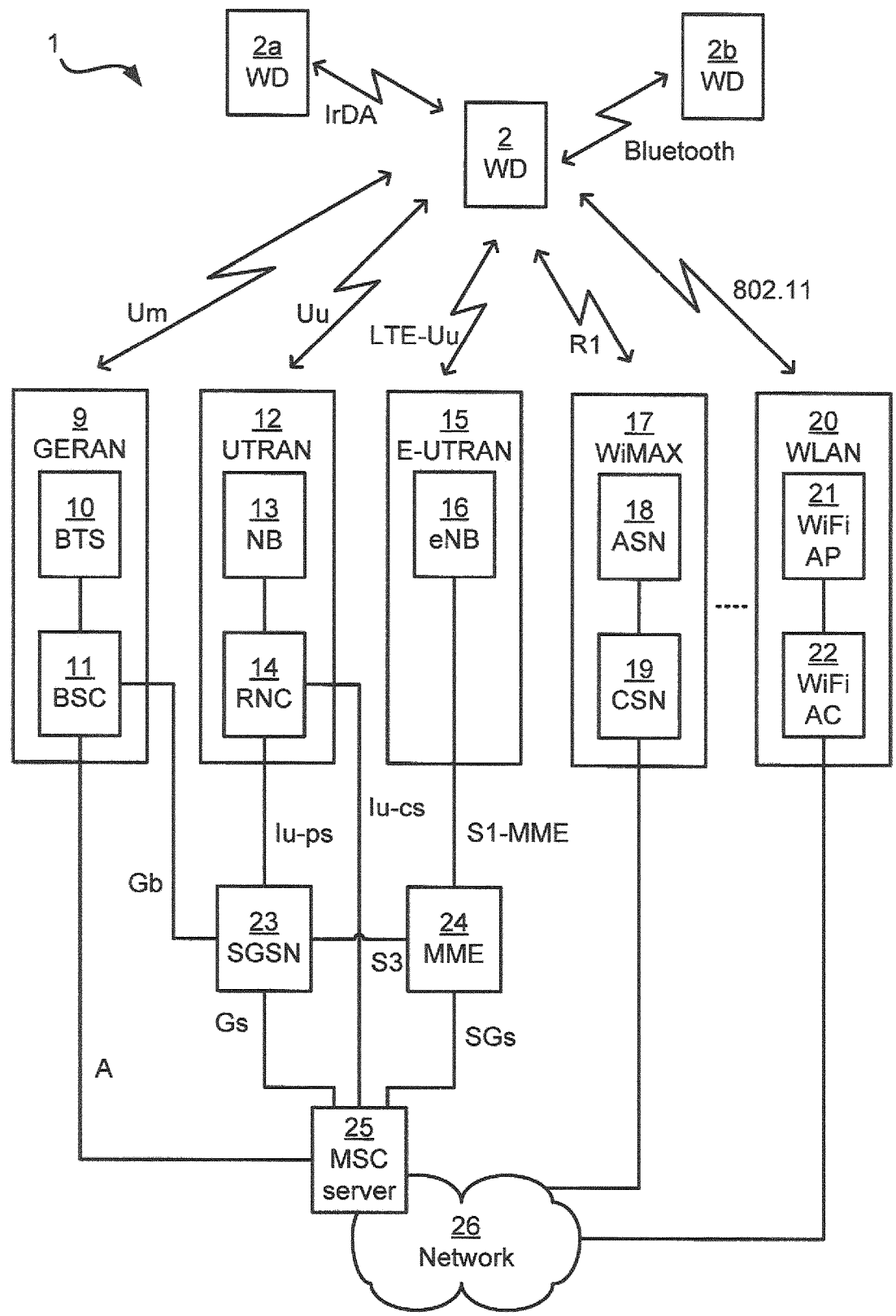
FIG. 1 is a schematic diagram illustrating a communication network where embodiments presented herein may be applied.

Radio link improvement is approaching the theoretical limit and the spectrum available to operators is often limited and expensive. The next performance and capacity leap may come from a network topology evolution utilizing a plurality of a mix of macro cells and pico, or micro cells, and utilizing a plurality of network access methods. Such networks are referred to as heterogeneous networks. FIG. 1 is a schematic diagram illustrating a communication network 1. As schematically illustrated in FIG. 1 a wireless device (WD) 2 is enabled to access services and content provided by a network 26 in a number of different ways. The WD 2 may be one of a user equipment (UE), a mobile terminal, a user terminal, a user agent, a mobile phone, a so-called smart phone, a tablet computers, and other handset equipment, etc. As the skilled person understands the number of such available ways to access the network 26 generally depends on the network topology of the actual communication network used and the functionality, capability and compatibility of the WD 2. According to the communication network 1 of FIG. 1 the WD 2 is enabled to access the network 26 by establishing a wireless link to one or more of a base transceiver station (BTS) 10, a NodeB (NB) 13, an eNodeB, E-UTRAN NodeB, also known as Evolved NodeB, (eNB) 16, a microwave access service network (ASN) 18 and a WiFi access point (AP) 21. The WD 2 is arranged communicate with the BTS 10 over the Um interface. The WD 2 is arranged communicate with the NB 13 over the Uu interface. The WD 2 is arranged communicate with the eNB 16 over the LTE-Uu interface. The WD 2 is arranged communicate with the ASN 18 over the R1 interface. The WD 2 is arranged communicate with the AP 21 over the IEEE 802.11 interface. The BTS 10, NB 13, eNB 16, ASN 18, and AP 21 will collectively be referred to as network nodes. As is understood, the communication system 1 may generally comprise a plurality of network nodes to, 13, 16, 18, 21 and a plurality of WDs 2. For example, the WD 2 may be operatively connected to a further WD 2a by an infrared communications link by an infrared data association (IrDA) interface. Further, the WD 2 may be operatively connected to yet a further WD 2b by a short-range radio lnk by a Bluetooth interface.

The communication network 1 is compliant with the Evolved Universal Terrestrial Radio Access Network (E-UTRAN) 15 by means of the eNB 16; typically the E-UTRAN consists only of network nodes in the form of eNBs 16 on the network side.

NodeB (NB) is a term used in UMTS (Universal Mobile Telecommunications System) equivalent to the BTS 10 description used in the Global System for Mobile Communications (GSM). For the NB 13 a radio network controller (RNC) 14 is in the Universal Terrestrial Radio Access Network (UTRAN) 12 located between the NB 13 and the network 26. The traditional NodeB typically has minimum functionality, and is controlled by the RNC 14. The communication network 1 is thus compliant with the UTRAN by means of the NB 13 and the RNC 14.

The BTS 10 is connected to the network 18 via a base station controller (BSC) 11 which offers functionality according to the GSM standard in the GSM/EDGE Radio Access Network (GERAN) 9. GERAN is the term given to the second-generation digital cellular GSM radio access technology, including its evolutions in the form of EDGE (Enhanced Data rates for Global Evolution) and, for most purposes, the General Packet Radio Service (GPRS). The communication network 1a is thus compliant with the GSM, EDGE, and GPRS standards by means of the BTS 10 and the BSC 11.

The ASN 18 is connected to the network 26 via a connectivity service network (CSN) 19 which by the worldwide interoperability for microwave access (WiMAX) 17 offers functionality according to one or more microwave standards. The communication network 1 is thus compliant with the WiMAX 17 by means of the ASN 18 and the CSN 19.

The WiFi AP 21 is connected to the network 26 via a WiFi access controller (AC) 22 which in a wireless local network (WLAN) 20 offers functionality according to one or more WiFi standards. The communication network 1 is thus compliant with the WLAN 20 by means of the WiFi AP 21 and the WiFi AC 22.

The communication network 1 may thus generally comply with any combination of W-CDMA (Wideband Code Division Multiple Access), LTE (Long Term Evolution), EDGE (Enhanced Data Rates for GSM Evolution, GPRS (General Packet Radio Service)), CDMA2000 (Code Division Multiple Access 2000), WiMAX, WiFi, IrDA, Bluetooth, etc., as long as the principles described hereinafter are applicable.

The BSC 11, RNC 14, and eNB 16 are operatively connected to the network 26 via a mobile switching center (MSC) 22. The BSC 11 and the RNC 14 are connected to the MSC server 25 via a serving GPRS support node (SGSN) 20 by interfaces Gb and Iu-ps, respectively. The RNC 14 is also directly connected to the MSC server 25 by interface Iu-cs. The eNB 16 is connected to the MSC server 25 via a mobility management entity (MME) 21 by interface S1-MME. The SGSN 20 is connected to the MSG server 25 by interface Gs; the SGSN 20 and MME 21 are connected by interface S3; the MME 21 is connected to the MSG server 25 by interface SGs; and BSC 11 is connected to the MSG server 25 by interface A.

The embodiments disclosed herein relate to associating a WD 2 with a radio access technology, RAT. As noted above the WD 2 may receive a request to perform handover (HO) of a second service to a second RAT. However, the WD 2 further supports a first service. This first service thus also needs to be associated with a RAT. In order to obtain association of a RAT supported by a WD 2 with a first service there is provided a WD 2, methods performed by the WD 2, a computer program comprising code, for example in the form of a computer program product, that when run on the WD 2, causes the WD 2 to perform the methods.

Figure 2:
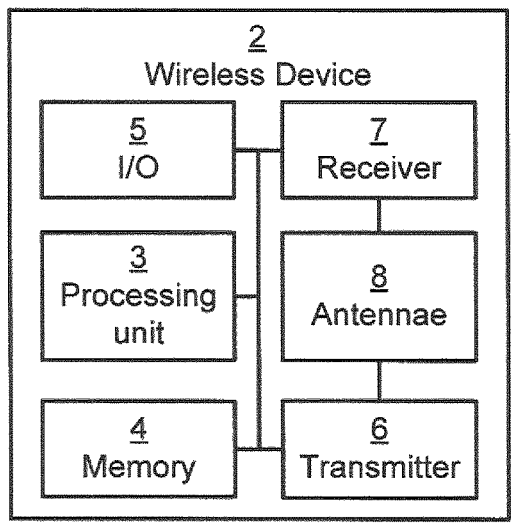
FIG. 2 is a schematic diagram showing functional modules of a wireless device.

FIG. 2 schematically illustrates, in terms of a number of functional modules, the components of a wireless device (WD) 2. A processing unit 3 is provided using any combination of one or more of a suitable central processing unit (CPU), multiprocessor, microcontroller, digital signal processor (DSP), application specific integrated circuit (ASIC) etc., capable of executing software instructions stored in a computer program product 22 (as in FIG. 3), e.g. in the form of a memory 4. Thus the processing unit 3 is thereby arranged to execute methods as herein disclosed. The memory 4 may also comprise persistent storage, which, for example, can be any single one or combination of magnetic memory, optical memory, solid state memory or even remotely mounted memory. The WD 2 may further comprise an input/output (I/O) interface 5 for receiving and providing information to a user interface. The WD 2 also comprises one or more transmitters 6 and receivers 7, comprising analogue and digital components forming the functionalities of a transmitter and a receiver, and a suitable number of antennae 8 for radio communication with the BTS 10, NB 13, eNB 16, AP 18. The one or more transmitters 6 and receivers 7 (as well as the antennae 8) may further comprise circuitry enabling Bluetooth communications with WD 2b. The one or more transmitters 6 and receivers 7 may further comprise circuitry enabling infrared communications with WD 2a. That is, the WD 2 may additionally comply with the Bluetooth standard and/or the IrDA standard. In this respect the WD 2 may be regarded as a so-called multi-mode wireless device. According to embodiments the WD 2 is arranged only to support one active cellular RAT, such as either LTE, WCDMA, CDMA, IS-95, CDMA2000, EDGE, GPRS, or GSM, at the time. Further, the WD 2 is arranged to handle one such cellular RAT and a WLAN, Bluetooth or IrDA based RAT simultaneously. However, as the skilled person would realize, this is just one of a number of suitable configurations of the WD 2. In general terms the WD 2 may be arranged to support a set of RATs, where the set of RATs comprises a first subset of RATs and a second subset of RATs. The first subset and the second subset are disjoint; i.e. a particular RAT is either a member of the first subset or the second subset, but not both. Then the WD 2 may be arranged to simultaneously support one RAT in the first subset and one RAT in the second subset, but not to simultaneously support two RATs in the first subset or two RATs in the second subset. The processing unit 3 controls the general operation of the WD 2, e.g. by sending control signals to the transmitter 6, receiver 7, and/or I/O 5 and receiving reports from the transmitter 6, receiver 7, and/or I/O 5 of its operation. Other components, as well as the related functionality, of the WD 2 are omitted in order not to obscure the concepts presented herein.

Figure 4:
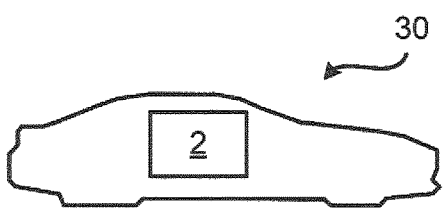
FIG. 4 is a schematic diagram of a vehicle.

The WD 2 may be provided as a standalone device or as a part of a further device. For example, the WD 2 may be provided in a vehicle 30. FIG. 4 illustrates a vehicle 30 comprising at least one WD 2 as herein disclosed. The WD 2 may be provided as an integral part of the vehicle 30. That is, the components of the WD 2 may be integrated with other components of the vehicle 30; some components of the vehicle 30 and WD 2 may be shared. For example, if the vehicle comprises a processing unit, this processing unit may be arranged to perform the actions of the processing unit 3 associated with the WD 2. Alternatively the WD 2 may be provided as a separate unit in the vehicle 30.

Figure 3:
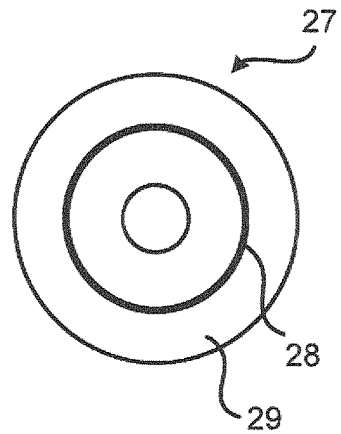
FIG. 3 shows one example of a computer program product comprising computer readable means.
Figure 5:
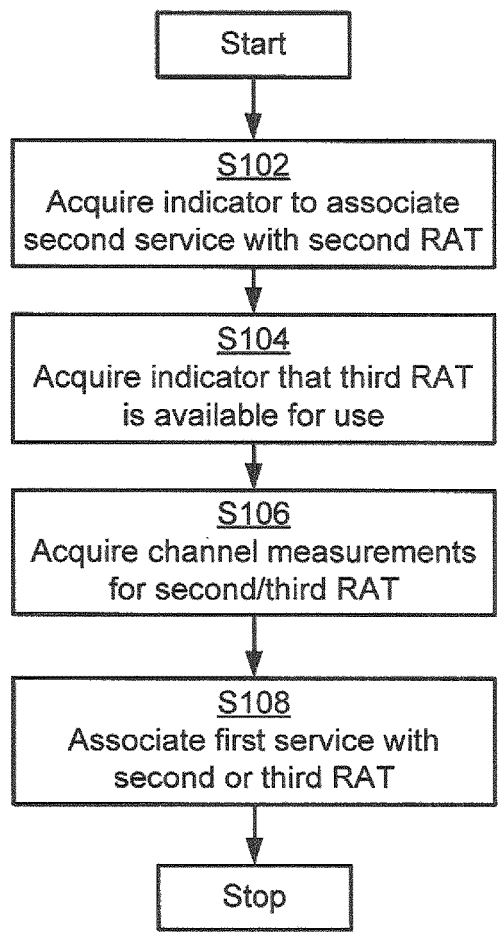
FIGS. 5 and 6 are flowcharts of methods according to embodiments.
Figure 6:
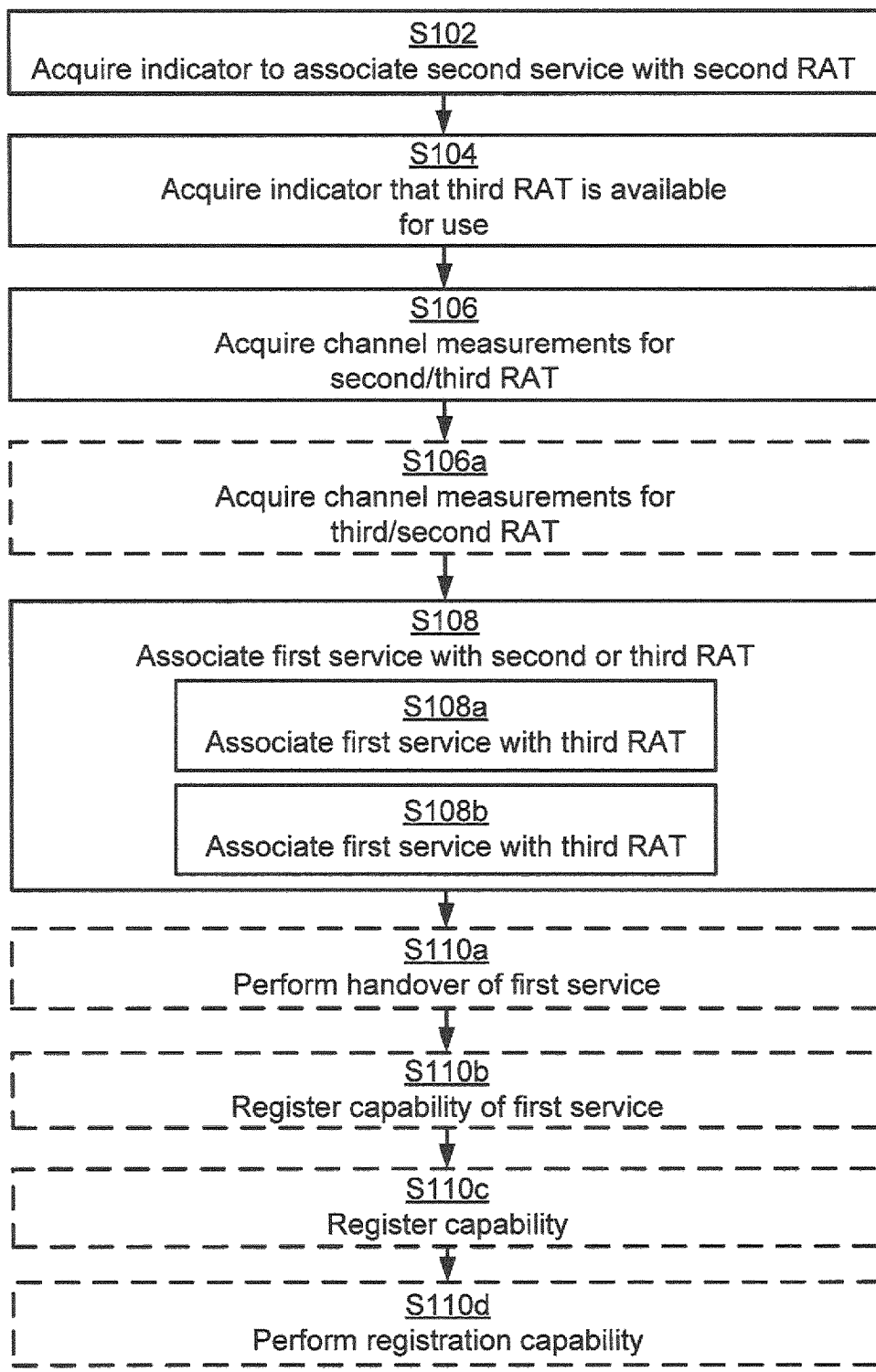

FIGS. 4 and 5 are flow charts illustrating embodiments of methods of associating a radio access technology, RAT, supported by a wireless device, WD, 2 with a first service. The methods are performed by the WD 2. The methods are advantageously provided as computer programs 28. FIG. 3 shows one example of a computer program product 27 comprising computer readable means 29. On this computer readable means 29, a computer program 28 can be stored, which computer program 28 can cause the processing unit 3 and thereto operatively coupled entities and devices, such as the memory 4, the I/O interface 5, the transmitter 6, the receiver 7 and/or the antennae 8 to execute methods according to embodiments described herein. In the example of FIG. 3, the computer program product 27 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 28 is here schematically shown as a track on the depicted optical disk, the computer program 28 can be stored in any way which is suitable for the computer program product 27.

Methods of associating a radio access technology, RAT, supported by a wireless device, WD, 2 with a first service will now be disclosed. The WD 2 is arranged to support at least a first RAT, a second RAT and a third RAT. According to one embodiment the WD 2 does not support simultaneous use of the first RAT and the second RAT.

As noted above, there may be different types of RATs, depending on the configuration of the WD 2 and the communication network 1. For example, the first RAT may support at least one of LTE and WiMAX. For example, the second RAT may support at least one of WCDMA, CDMA, IS-95, CDMA2000, EDGE, GPRS, and GSM. For example, the third RAT may support at least one of WLAN, Bluetooth, and IrDA. As the skilled person understands, the current availability for use of any of these RATs generally depends on the network topology of the communication network 1 currently serving the WD 2.

Further, different RATs may support different services. Particularly, the second RAT supports a first service and a second service. The first RAT supports the first service but not the second sendee. The third RAT supports at least the first service. That is, the third RAT may support the first service as well as the second service. According to embodiments the first service is a packet switched (PS) service, and the second service is a circuit switched (CS) service. According to other embodiments the first service is a first packet switched service and the second service is a second packet switched service.

Returning now to FIG. 1, in a step S102 the WD 2 acquires an indicator that the second service is to be associated with the second RAT. The WD 2 is thus arranged to acquire a need for performing HO to a second RAT in order to requirement to start support of a second service. The indicator is acquired by the processing unit 3 of the WD 2. The determination may be performed in different ways. For instance, the WD 2 may be arranged to receive a circuit switched fallback command from the network node of the first RAT. That is, according to one embodiment the indicator is a circuit switched fallback, CSFB, indicator indicating a need for supporting CS services (i.e. second service).

In another embodiment. A network node of a second RAT may receive an order (or request.) from a network node of the first RAT to take over the connection of the WD 2. Then a HO command is transmitted from the network node of the first RAT to the WD 2 including information about the network node of the second RAT. The HO may be trigged by network node load balancing needs. In yet another embodiment the WD 2 may trig an IRAT HO event (in active mode) or a need for IRAT reselection (in idle mode), due to signal strength (i.e. coverage) reasons according to received (and possible adjusted) IRAT HO/reselection parameters from a network node. In yet another embodiment, user input received by the I/O interface 5 may be used for triggering the HO/reselection process. For instance, a user interacting with the WD 2 may initiate a sendee not supported by the first RAT (but by the second RAT, for instance a CS service).

Since the second service is to be associated with the second RAT it is assumed that the second RAT is available for use. The WD 2 may thus further be arranged to associate the second service with the second RAT. The processing unit 3 of the WD 2 is further arranged to, in a step S104, acquire an indicator that the third RAT is available for use. Hence both the second RAT and the third RAT is available for use. Further, as disclosed above, the WD 2 is arranged to allow simultaneous use of the second RAT and the third RAT. Thus, the first service may either be associated with the second RAT or the third RAT.

Different criteria may be evaluated in order to determine which of the second RAT and the third RAT to associate the first service with. One such particular criterion is based on channel conditions. In order to determine which of the second RAT and the third RAT to associate the first service with the WD 2 therefore acquires channel measurements. The processing unit 3 of the WD 2 is therefore arranged to, in a step S106, acquire channel measurements for at least one of the second RAT and the third RAT. As will further be disclosed below, the channel measurements may be based on different parameters which provide information of the channel characteristics. It may be enough to acquire such channel measurements only for the second RAT. It may also be enough to acquire channel measurements only for the third RAT. However, according to embodiments the processing unit 3 of the WD 2 is further arranged to, in a step S106a, acquire channel measurements also for the other of the second RAT and the third RAT. Thus, according to some embodiments channel measurements are acquired for both the second RAT and the third RAT.

The processing unit 3 of the WD 2 is then arranged to, in a step S108, associate the first service with one of the second RAT and the third RAT based on the acquired channel measurements.

Depending on whether the WD 2 is in active or idle mode, the WD 2 is either operatively connected to (active, i.e. first service on-going) or camping on (idle, i.e. no first service on-going) a network node operating on a first RAT. The active mode may be an RRC_connected mode with or without use of discontinuous reception (DRX) cycles. That is, in the exemplary communication network 1 of FIG. 1 the WD 2 may either be operatively connected to the first RAT or be camping on the first RAT when receiving the indication is step S102.

That is, according to one embodiment the WD 2 is operatively connected to a network node of the first RAT when the indicator is acquired. For example, the WD 2 may be operatively connected to the eNB 16. The indicator may relate to an inter RAT, IRAT, handover caused by use of the second service being required. The WD 2 may therefore be arranged to, in a step S110a, perform handover of the first service from the first RAT to the second RAT. Step S110a is thus performed in a case the first service has been associated with the second RAT in step S108. However, as noted in step S108 the first sendee may alternatively be associated with the third RAT. The WD 2 may therefore be arranged to, in a step Snob, perform registration of the WD 2 with a network node of the third RAT and perform handover of the first service from the first RAT to the third RAT. Step S110b is thus performed in a case the third RAT has been associated with the first service in step S108.

According to another embodiment the WD is camping to a network node of the first RAT when the indicator is acquired. For example, the WD 2 may be camping to the eNB 16. The indicator may relate to an inter RAT, IRAT, reselection caused by use of the second service being required. The WD 2 may therefore be arranged to, in a step S110c, register capability of supporting the first service with a network node of the second RAT. Step S110c is thus performed in a case the first service has been associated with the second RAT in step S108. However, as noted in step S108 the first service may alternatively be associated with the third RAT. The WD 2 may therefore be arranged to, in a step S110d, perform a registration capability of supporting the first service with a network node of the third RAT. Step S110d is thus performed in a case the third RAT has been associated with the first service in step S108. The WD 2 is thus arranged to register a need to support a first service to the second or third RAT (idle mode) or make a HO of the first services to the second or third RAT (active mode). The WD 2 is arranged to in conjunction therewith initiates the second service on the second RAT according to well known principles in the art.

As noted above, channel measurements are acquired for at least one of the second RAT and the third RAT. As the skilled person understands the channel measurements concern measures of the communications channel between the WD 2 and a node in the communication network 1 supporting communication with the WD by means of the second RAT and/or the third RAT. According to one embodiment the channel measurements represent channel state information. In particular, the channel state information may be associated with at least one metric. The WD 2 may thereby determine whether particular criteria for the channel measurements are fulfilled or not. The decision made in step 108 (i.e. the decision to associate the first service with either the second RAT or the third RAT) may be based on the at least one metric. As the skilled person understands there are different available metrics. One metric in particular is a coverage metric. For example if a signal strength/load/capacity/latency etc. metric for the third RAT is not fulfilled then the first service needs to be HO to the second RAT together with the second service. The step S108 of associating may thus comprise associating, in a step S108a, the first service with the third RAT in a case the coverage metric is fulfilled for the third RAT. However, it the signal strength/load/capacity/latency etc. for the third RAT is fulfilled and, say the second RAT is GSM/EDGE the first services may be best handled by the third RAT since this may enable better user experience, higher throughput, lower latency, etc. In particular, the first service may be associated with the third RAT in a case the coverage metric is fulfilled for the third RAT and the second RAT is GSM, GPRS or EDGE, step S108b. Further metrics which could be equally used include, but are not limited to: signal strength, signal to noise ratio (SNR), channel capacity, transmission latency, available data rates, the amount of payload data to be transmitted, operator charging policies, transmission reliability, etc. The choice of a particular metric may be dependent on a number of factors, depending on which of the metrics that are of interest for the situation at hand. Typically, if a channel state metric associated with the first service is better for the third RAT than for the second RAT, it may be preferred to use the third RAT (and vice versa) for the first service.

In summary, once an IRAT HO or IRAT reselection (for instance due to request to support a CS service) to a second RAT is requested the WD 2 acquires channel measurements for at least one of the second RAT and a third RAT and determines where to continue the PS services (the same RAT as the CS services or on the third RAT). Hence the WD 2 may determine that the PS should be served by the third RAT when the CS is served by the second RAT. The determination step may be performed by determining that the WD 2 is to transmit a HO event (to the second RAT), receiving an IRAT HO command form a network node, or receiving a CS fallback command from the network node. It may in some embodiments also be user driven, for instance determined when the user initiates a call (requiring CS services). Furthermore, the channel measurements may for instance provide information about the third RAT only (when the second RAT is GSM/EDGE then a third RAT in the form of WLAN is likely better for PS than GPRS/EDGE as long as WLAN coverage exists and the WLAN system is not overloaded). The channel measurements may additionally and/or alternatively relate to parameters such as signal strength/throughput/load measurements etc. for at least one of the second RAT and third RAT, where the decision to move the PS service to the second RAT or third RAT depends on these parameters.

The present disclosure has mainly been described above with reference to a few embodiments. However, as is readily appreciated by a person skilled in the art, other embodiments than the ones disclosed above are equally possible within the scope of the present disclosure, as defined by the appended patent claims. For example, in the above disclosure the first RAT has according to some embodiments been described as a PS only system that may be an LTE system, and the second RAT as a PS and CS system that may be a 3G system. However, these are just examples and as also disclosed above other network topologies and radio access techniques may equally apply. For example GSM is one example of a CS and PS system. Furthermore, the third RAT supporting at least PS services has been exemplified by WLAN. For example, Bluetooth is one example of a RAT with properties fulfilling the requirement of the third RAT. Furthermore, a more general first service than PS and a more general second service than CS are also allowed within the scope of the disclosed embodiments.

The invention claimed is:

1. A method of associating a radio access technology (RAT) supported by a wireless device (WD) with a first service; wherein the WD supports at least a first RAT, a second RAT, and a third RAT; wherein the second RAT supports a first service and a second service; wherein the first RAT supports the first service but not the second service; wherein the third RAT supports at least the first service; wherein the method comprises the WD:
acquiring an indicator that the second service is to be associated with the second RAT;
acquiring an indicator that said third RAT is available for use;
acquiring channel measurements for at least one of the second RAT and the third RAT; and
associating the first service with one of the second RAT and the third RAT based on the acquired channel measurements.

2. The method of claim 1, wherein the WD does not support simultaneous use of the first RAT and the second RAT.

3. The method of claim 1, further comprising acquiring channel measurements also for the other one of the second RAT and third RAT.

4. The method of claim 1:
wherein the channel measurements represent channel state information, the channel state information being associated with at least one metric;
wherein the associating the first service is based on the at least one metric.

5. The method of claim 4:
wherein the at least one metric is a coverage metric;
wherein the associating comprises associating the first service with the third RAT in response to the coverage metric being fulfilled for the third RAT.

6. The method of claim 5:
further comprising acquiring channel measurements also for the other one of the second RAT and third RAT;
wherein the associating comprises associating the first service with the third RAT in response to the coverage metric being fulfilled for the third RAT and the second RAT is Global System for Mobile communications (GSM), General Packet Radio Service (GPRS), or Enhanced GPRS (EDGE).

7. The method of claim 1, wherein the indicator is a circuit switched fallback (CSFB) indicator.

8. The method of claim 1:
wherein the WD is operatively connected to a network node of the first RAT when the indicator is acquired;
wherein the indicator relates to an inter RAT (IRAT) handover caused by use of the second service being required;
further comprising performing one of:
handover of the first service from the first RAT to the second RAT; or
registration of the WD with a network node of the third RAT and performing handover of the first service from the first RAT to the third RAT.

9. The method of claim 1:
wherein the WD is camping to a network node of the first RAT when the indicator is acquired;
wherein the indicator relates to an inter RAT (IRAT) reselection caused by use of the second service being required;
further comprising one of:
registering capability of supporting the first service with a network node of the second RAT; or
registering capability of supporting the first service with a network node of the third RAT.

10. The method claim 1, wherein the first service is a packet switched service and the second service is a circuit switched service.

11. The method of claim 1, wherein at least one of:
the first RAT supports at least one of Long Term Evolution (LTE) and Worldwide Interoperability for Microwave Access (WiMAX);
the second RAT supports at least one of Code Division Multiple Access (CDMA), Wideband CDMA (WCDMA), Interim Standard 95 (IS-95), CDMA2000, Global System for Mobile communications (GSM), General Packet Radio Service (GPRS), and Enhanced GPRS (EDGE);
the third RAT supports at least one of Wireless Local Area Network (WLAN), Bluetooth, and Infrared Data Association (IrDA).

12. The method of claim 7,
wherein the second service is a circuit-switched service and the first service is a packet-switched service;
wherein acquiring the CSFB indicator comprises the wireless device acquiring the CSFB indicator when the wireless device is served by the first RAT that does not support circuit-switched service; and
wherein the method comprises in response to receiving the CSFB indicator, when the wireless device associates the packet-switched service with the second RAT based on the acquired channel measurements, the wireless device performing handover to the second RAT for using the packet-switched service supported by the second RAT.

13. The method of claim 7,
wherein the second service is a circuit-switched service and the first service is a packet-switched service;
wherein acquiring the CSFB indicator comprises the wireless device acquiring the CSFB indicator when the wireless device is served by the first RAT; and
wherein the method comprises in response to receiving the CSFB indicator, when the wireless device associates the packet-switched service with the third RAT based on the acquired channel measurements, the wireless device performing handover to the third RAT for using the packet-switched service supported by the third RAT.

14. A wireless device (WD) for associating a radio access technology (RAT) supported by the WD with a first service; wherein the WD is configured to support at least a first RAT, a second RAT, and a third RAT; wherein the second RAT supports a first service and a second service; wherein the first RAT supports the first service but not the second service; wherein the third RAT supports at least the first service; the WD comprising:

a processing circuit configured to:
acquire an indicator that the second service is to be associated with the second RAT;
acquire an indicator that said third RAT is available for use;
acquire channel measurements for at least one of the second RAT and the third RAT; and
associate the first service with one of the second RAT and the third RAT based on the acquired channel measurements.

15. The WD of claim 14, wherein the WD is configured not to support simultaneous use of the first RAT and the second RAT.

16. The WD of claim 14, wherein the processing circuit is further configured to acquire channel measurements also for the other one of the second RAT and third RAT.

17. The WD of claim 14, wherein the processing circuit is further configured to associate the first service with the third RAT in response to a coverage metric being fulfilled for the third RAT.

18. The WD of claim 17, wherein the processing circuit is further configured to:
acquire channel measurements also for the other one of the second RAT and third RAT;
associate the first service with the third RAT response to the coverage metric being fulfilled for the third RAT and the second RAT is Global System for Mobile communications (GSM), General Packet Radio Service (GPRS), or Enhanced GPRS (EDGE).

19. The WD of claim 14:
wherein the WD is configured to be operatively connected to a network node of the first RAT when the indicator is acquired;
wherein the indicator relates to an inter RAT (IRAT) handover caused by use of the second service being required;
wherein the processing circuit is further configured to:
perform handover of the first service from the first RAT to the second RAT; or
perform registration of the WD with a network node of the third RAT and perform handover of the first service from the first RAT to the third RAT.

20. The WD of claim 14:
wherein the WD is configured to be camping to a network node of the first RAT when the indicator is acquired;
wherein the indicator relates to an inter RAT (IRAT) reselection caused by use of the second service being required;
wherein the processing circuit is further configured to:
register capability of supporting the first service with a network node of the second RAT; or
perform registration capability of supporting the first service with a network node of the third RAT.

21. A vehicle, comprising:
at least one wireless device (WD) configured to support at least a first RAT, a second RAT, and a third RAT; wherein the second RAT supports a first service and a second service; wherein the first RAT supports the first service but not the second service; wherein the third RAT supports at least the first service, the WD comprising a processing circuit configured to:
acquire an indicator that the second service is to be associated with the second RAT;
acquire an indicator that said third RAT is available for use;
acquire channel measurements for at least one of the second RAT and the third RAT; and
associate the first service with one of the second RAT and the third RAT based on the acquired channel measurements.

22. A computer program product stored in a non-transitory computer readable medium for controlling the associating of a radio access technology (RAT) supported by a wireless device (WD) with a first service; wherein the WD is configured to support at least a first RAT, a second RAT, and a third RAT; wherein the second RAT supports a first service and a second service; wherein the first RAT supports the first service but not the second service; wherein the third RAT supports at least the first service; the computer program product comprising software instructions which, when run on one or more processors of the WD, causes the WD to:
acquire an indicator that the second service is to be associated with the second RAT;
acquire an indicator that said third RAT is available for use;
acquire channel measurements for at least one of the second RAT and the third RAT; and
associate the first service with one of the second RAT and the third RAT based on the acquired channel measurements.

* * * * *